Dec. 15, 1970    D. K. McLEAN ET AL    3,547,535
MICROFILM DOCUMENT COPIER

Filed March 4, 1968    9 Sheets-Sheet 1

INVENTORS
Douglas Keith McLean
Stanley A. Bennett
Stanley A. Bennett, Jr.

BY
ATTORNEYS

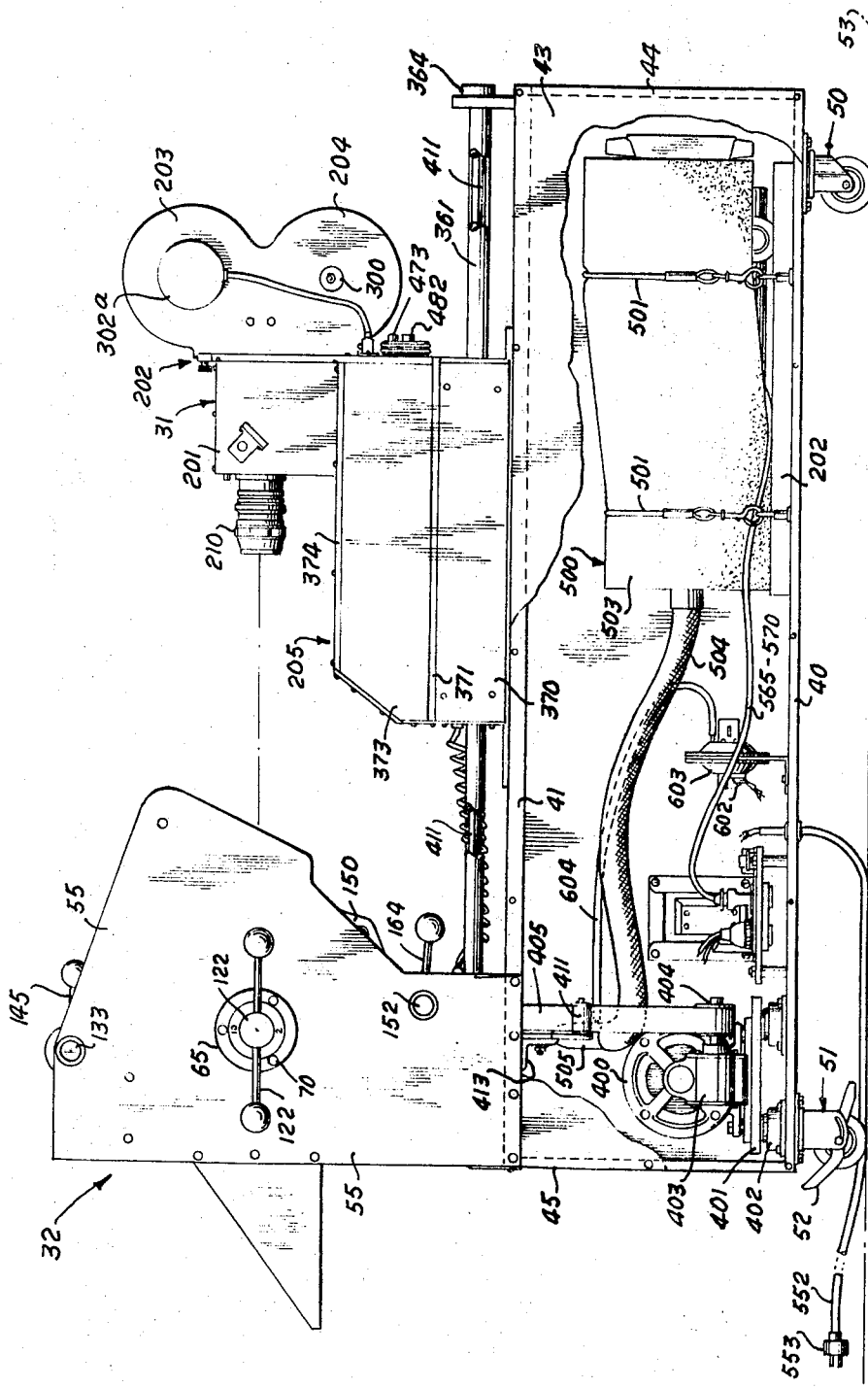

Dec. 15, 1970 D. K. McLEAN ETAL 3,547,535
MICROFILM DOCUMENT COPIER
Filed March 4, 1968 9 Sheets-Sheet 3
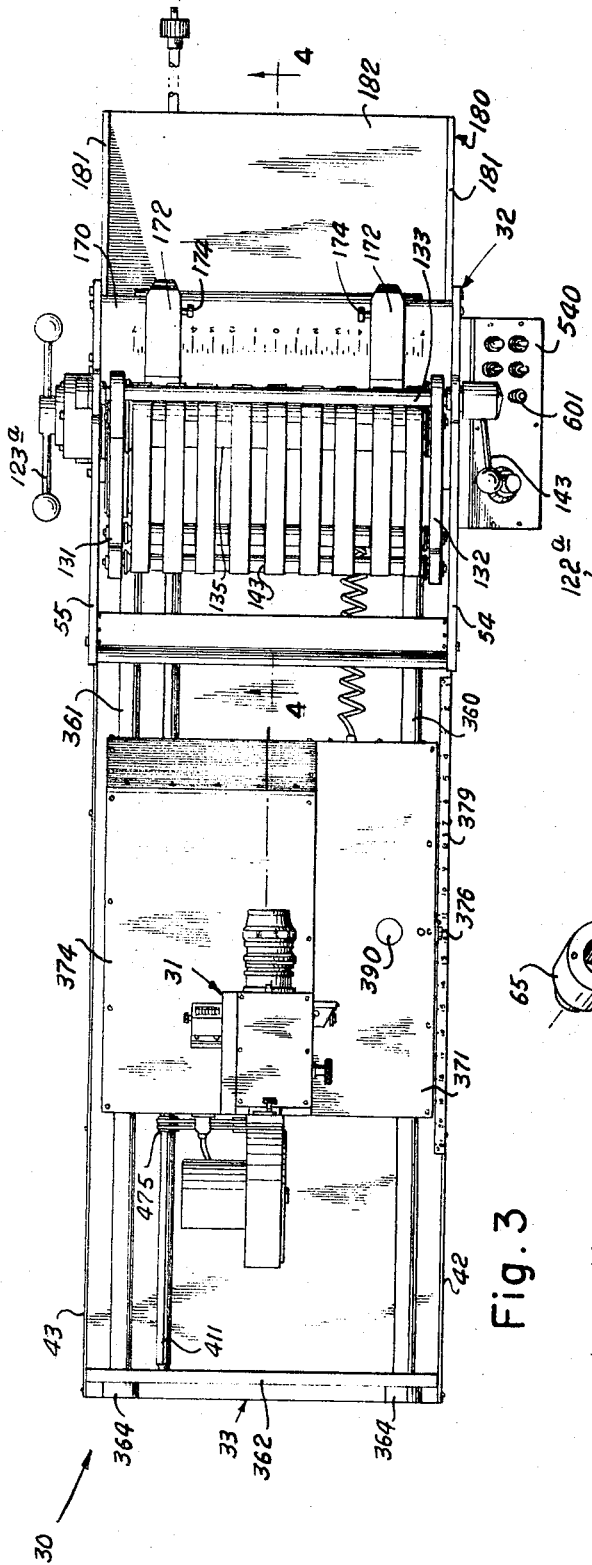
Fig. 3
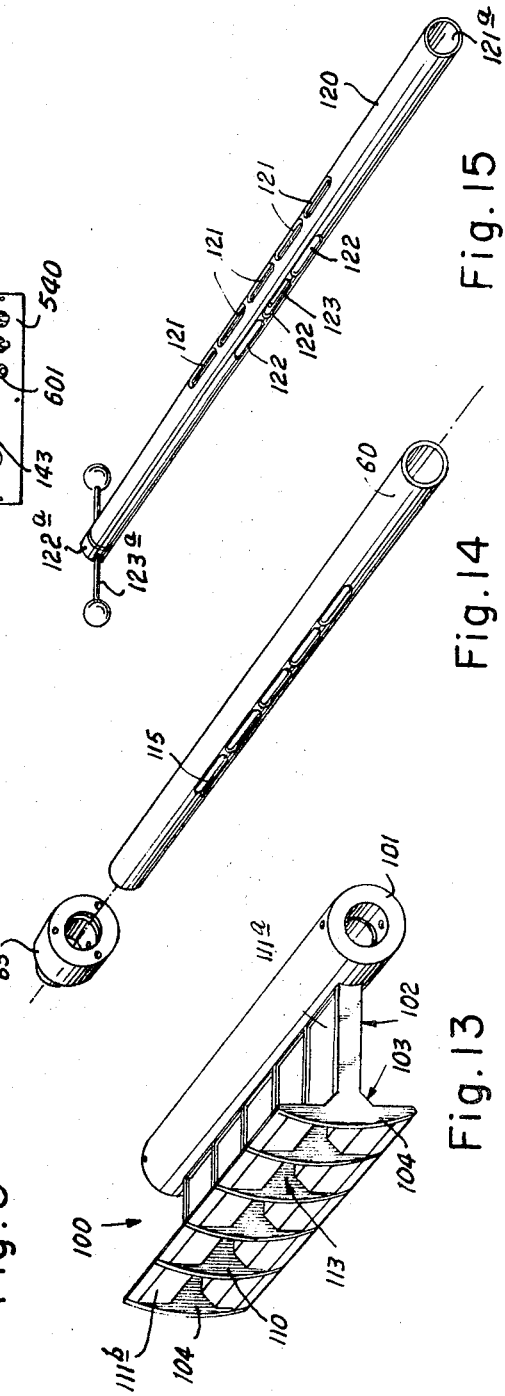
Fig. 15
Fig. 14
Fig. 13
INVENTORS
Douglas Keith McLean
Stanley A. Bennett
Stanley A. Bennett, Jr.
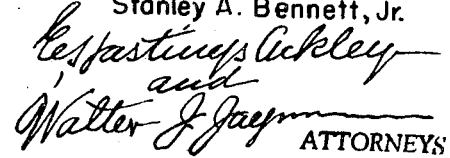
ATTORNEYS

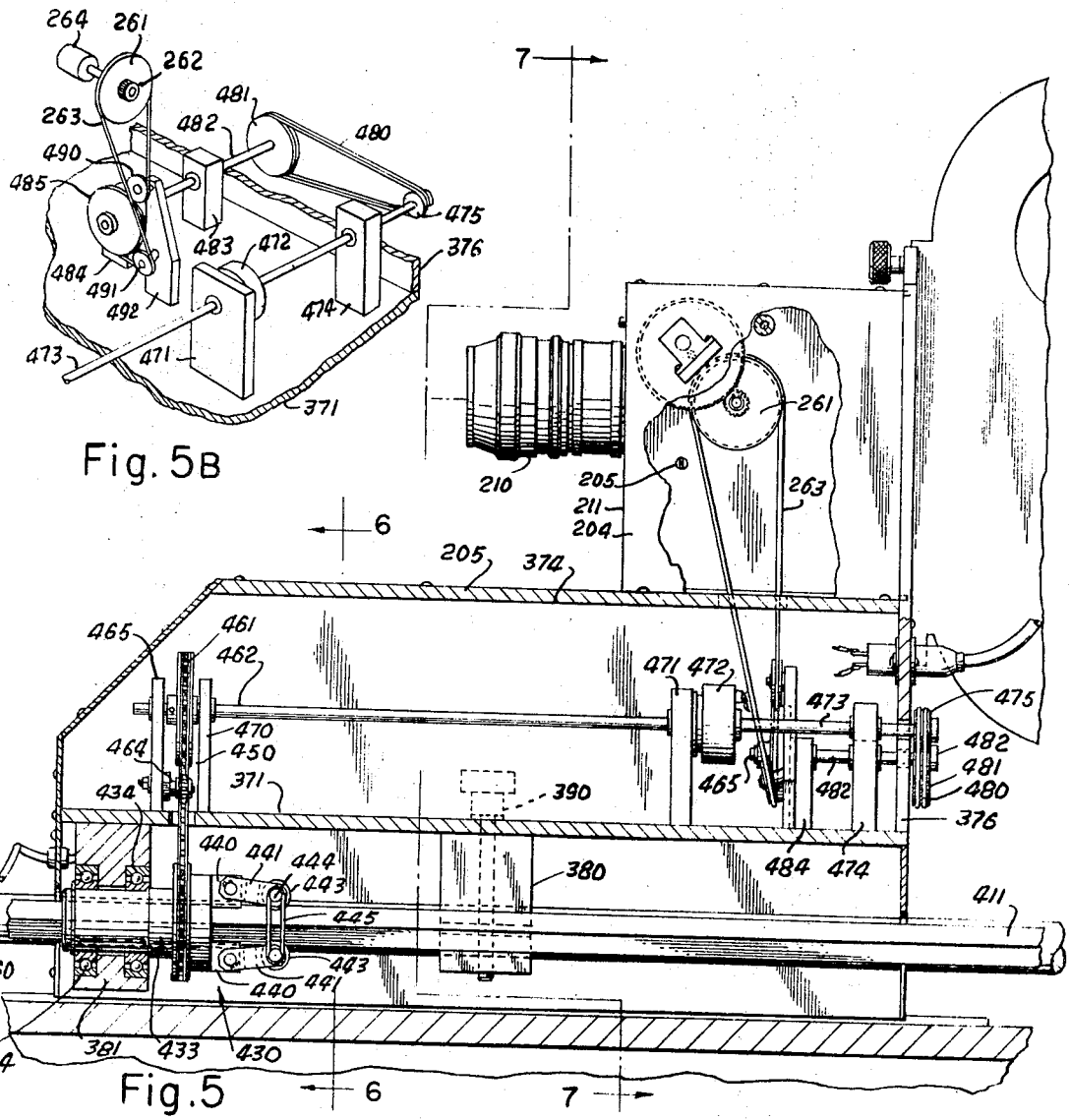
Fig. 5B
Fig. 5
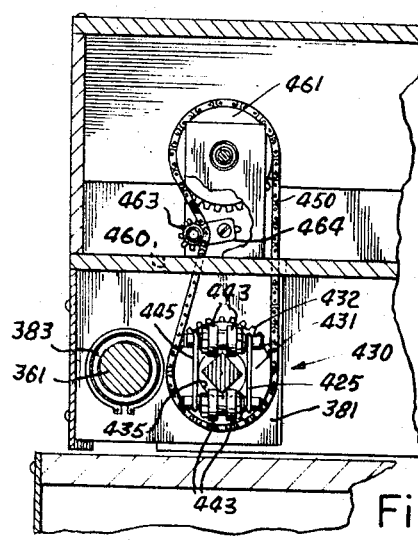
Fig. 6
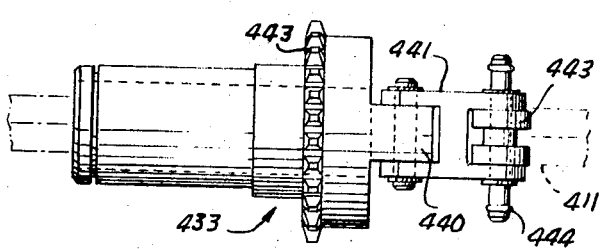
Fig. 5A
INVENTORS
Douglas Keith McLean
Stanley A. Bennett
Stanley A. Bennett, Jr.

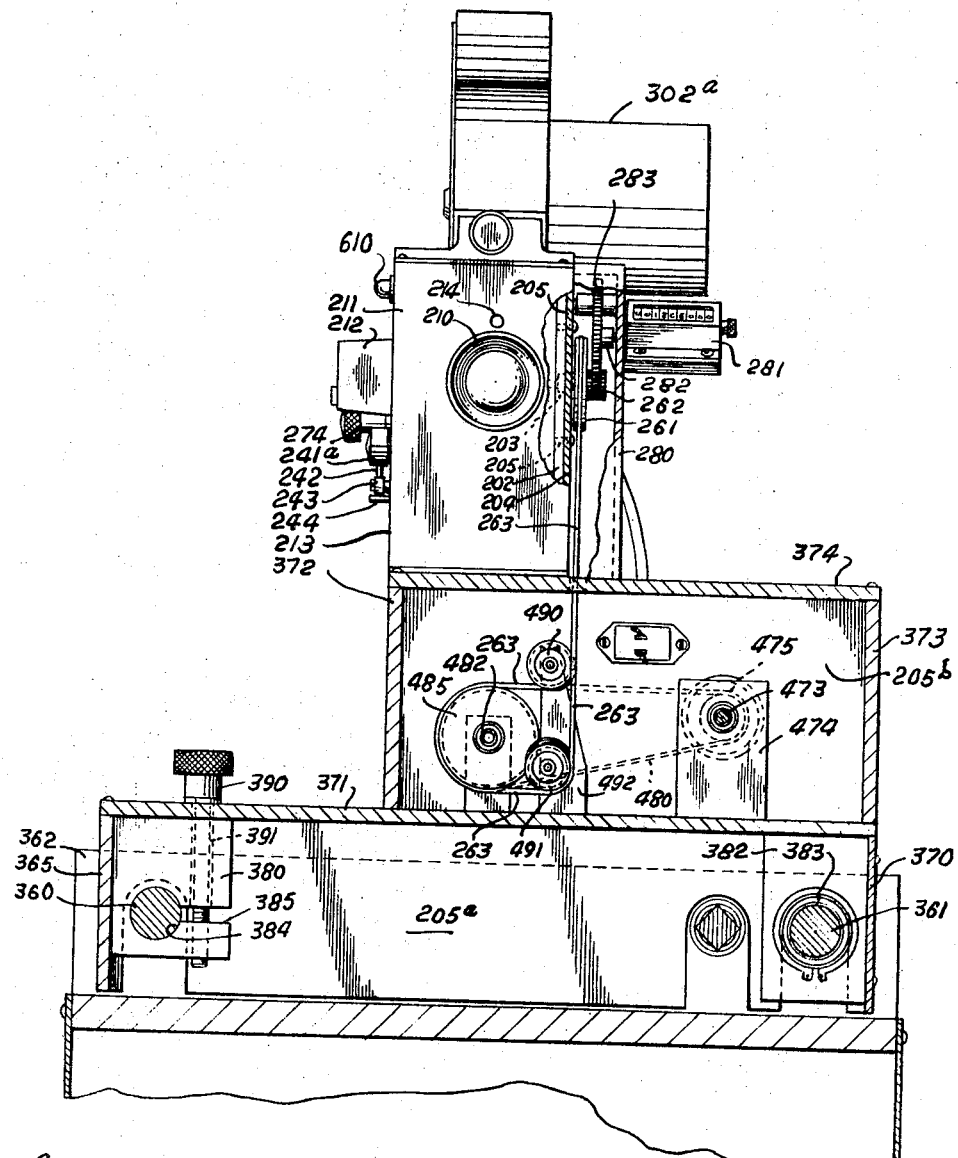

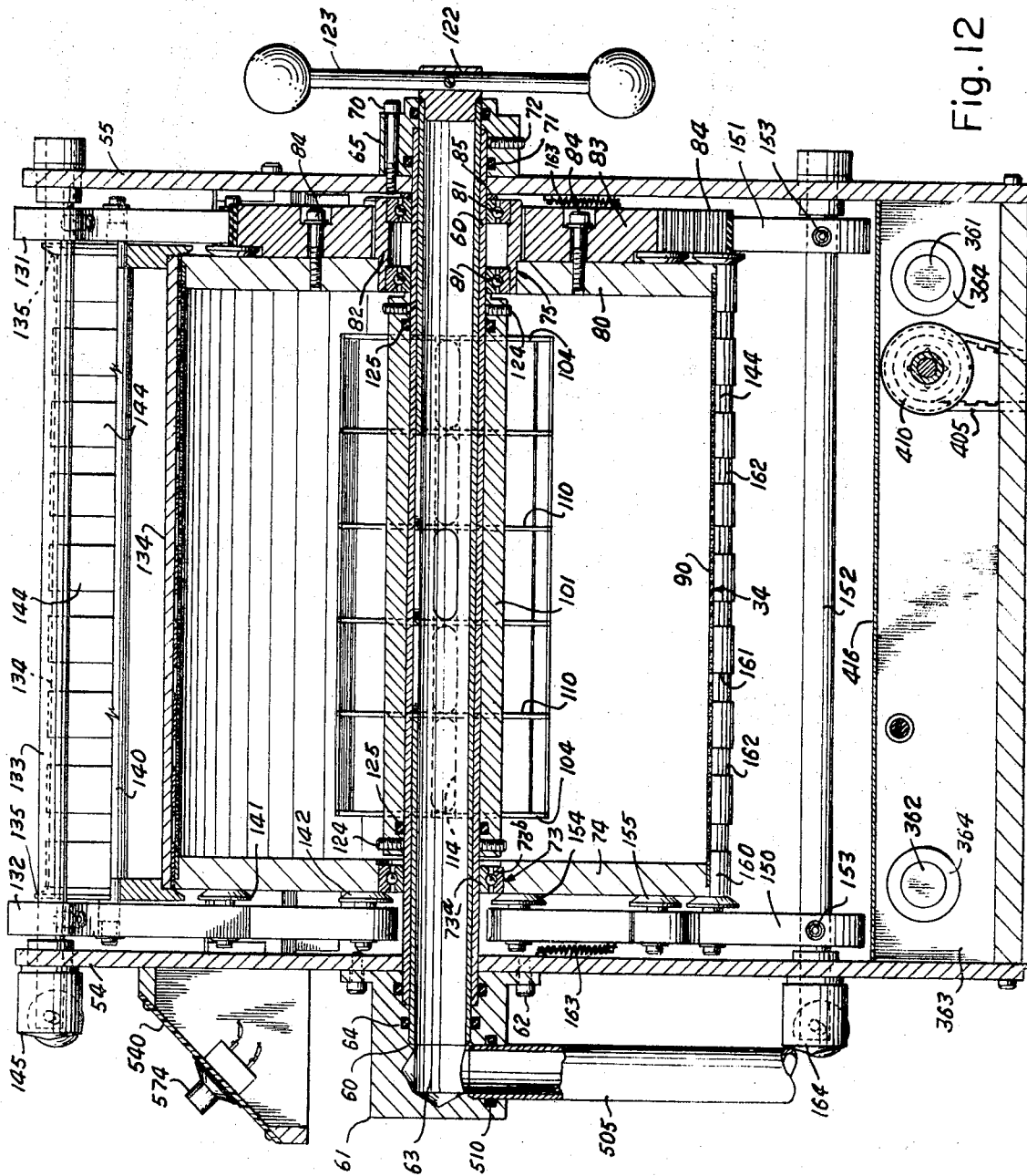

United States Patent Office 3,547,535
Patented Dec. 15, 1970

3,547,535
MICROFILM DOCUMENT COPIER
Douglas Keith McLean and Stanley A. Bennett, Dallas, and Stanley A. Bennett, Jr., Mesquite, Tex., assignors to Micro Instrument Corporation, Dallas, Tex., a corporation of Texas
Filed Mar. 4, 1968, Ser. No. 710,044
Int. Cl. G03b 27/48
U.S. Cl. 355—49
12 Claims

ABSTRACT OF THE DISCLOSURE

A continuous-flow type photocopier including a camera, a document conveyor having rotatable vacuum drum for holding a document and moving it across the optical path of the camera, a camera support moveable relative to the drum, and a drive mechanism for the camera and drum for driving the camera at various distances from the drum and at speeds synchronized with the drum speed for selected demagnification ratios.

---

This invention relates to photocopying apparatus and more particularly to a constant-flow type photocopier.

It is a particularly important object of the invention to provide a new and improved constant-flow type device for continuously photographing documents moved across the optical path of the camera.

It is another object of the invention to provide a photocopier of the character described including a document conveyor having an adjustable vacuum drum for the supporting and moving documents of various sizes across the camera optical path without using a pressure plate or glass for holding the document on the conveying surface.

It is another object of the invention to provide a photocopier of the character described wherein the distance between the document being copied and the camera is adjusted in accordance with the demagnification ratio employed.

It is another object of the invention to provide a photocopier of the character described wherein the speed of travel of the image receiving material is correlated with the rate of travel of the document copied in accordance with the demagnification ratio employed.

It is another object of the invention to provide a photocopier of the character described wherein the image receiving material and the document are driven from a common power source with the movement rates of the image receiving material and the document being adjusted to a predetermined ratio in accordance with the width of the document being copied.

It is a further object of the invention to provide a photocopier of the character described in which the rate of movement of the image receiving material is inversely related to the rate of movement of the document as determined by the ratio of the width of the image receiving material to the width of the document being copied.

It is still another object of the invention to provide a photocopier of the character described wherein the vacuum system of the conveyor drum is deactivated when a document is not disposed over the vacuum area of the drum in the optical path of the camera.

It is another object of the invention to provide a photocopier of the character described having a camera drive mechanism slidable along and operable from a rotatable shaft at any longitudinal position along the length of the shaft.

It is a further object of the invention to provide a photocopier of the character described having quick-release type of document pressure assemblies for holding a document against the vacuum drum on opposite sides of the vacuum area of the drum for quickly releasing a document from the drum in the event a document becomes jammed in the conveyor.

It is another object of the invention to provide a photocopier of the character described wherein the optical path between the document being copied and the image receive material passes through a narrow slit aperture for exposing a continuously moving strip of film behind the slit.

It is another object of the invention to provide a photocopier of the character described which includes a through-the-lens viewing system for accurate camera focusing.

It is another object of the invention to provide a photocopier of the character described which includes a document conveyor having a perforated drum for driving a document including an adjustable vacuum shoe positioned within the drum for imposing a vacuum through the drum perforations over an area variable between predetermined limits.

It is still another object of the invention to provide a photocopier of the character described wherein the camera drive speed is quickly changed for varying the rate of movement of the film through the camera.

It is another object of the invention to provide a modified form of photocopier of the character described, wherein the image projected on the image receiving material is distorted to provide a predetermined change in proportions between the lateral and longitudinal dimensions of the recorded image relative to the document copied.

It is another object of the invention to provide a modified form of photocopier utilizing an anamorphic lens oriented to provide greater demagnification of a document laterally then longitudinally.

It is still a further object of the invention to provide another modified form of photocopier of the character described wherein the recorded image is distorted relative to the document copied by decreasing the aperture slit of the camera and increasing the camera speed to increase the length of the document relative to its width in the copied image.

It is another object of the invention to provide a photocopier of the character described which accommodates a plurality of thicknesses of material to be copied without requiring adjustment of the apparatus since a transparent pressure plate is not employed for holding the material flat along the surface on which it is conveyed during copying.

It is another object of the invention to provide a photocopier of the character described wherein a vacuum switch is employed for detection of the leading edge of a document to be copied thereby avoiding possible damage to the leading edge as occurs with a conventional mechanical sensing device for activating the camera system as the document moves into the optical path of the camera.

It is another object of the invention to provide a photocopier of the character described which is particularly well suited to self feeding of long documents.

It is a further object of the invention to provide a photocopier of the character described which produces a cleaner copy of a document and minimizes image distortion or shift inherent in a photocopier utilizing a glass pressure plate between the document and the lens of the camera.

It is another object of the invention to provide a photocopier of the character described wherein the camera utilizes a power takeoff from a spline shaft which includes hinged spring loaded coupling members engageable with the spline shaft and rotatable by its premitting substantial latitude in dimensions while effecting power transfer without play or backlash.

Additional objects and advantages of the invention will be readily apparent from the reading of the following description of the device constructed in accordance with the invention and reference to the accompanying drawings thereof wherein:

FIG. 2 is a view in elevation of the other side of the photocopier partially broken away to disclose details of components of the apparatus housed in the base;

FIG. 3 is a top plan view of the photocopier;

FIG. 5 is an enlarged fragmentary view partially in section and partially broken away, taken along the line 5—5 of FIG. 3 showing details of the camera drive mechanism;

FIG. 5A is an enlarged top view of the principal components of the power transfer assembly for driving the camera at any position along the drive shaft;

FIG. 5B is a fragmentary view in perspective partially broken away showing a portion of the camera drive mechanism;

FIG. 6 is a fragmentary view in section taken along the line 6—6 of FIG. 5 showing a portion of the camera drive mechanism;

FIG. 7 is a view partially in section and partially in elevation taken along the line 7—7 of FIG. 5;

FIG. 10 is an enlarged fragmentary view in section taken along the line 10—10 of FIG. 8 showing the slip clutch of the takeup reel spindle;

FIG. 12 is a view in section partially broken away taken along the line 12—12 of FIG. 4 illustrating principally the details of the vacuum drum of the document conveyor;

FIG. 13 is a perspective view of the vacuum shoe of the vacuum drum;

FIG. 14 is a view in perspective of the shaft supporting the vacuum throat and drum;

FIG. 15 is a view in perspective of the vacuum control tube for adjusting the width of the vacuum applied through the drum by the throat;

Figures 1, 18:
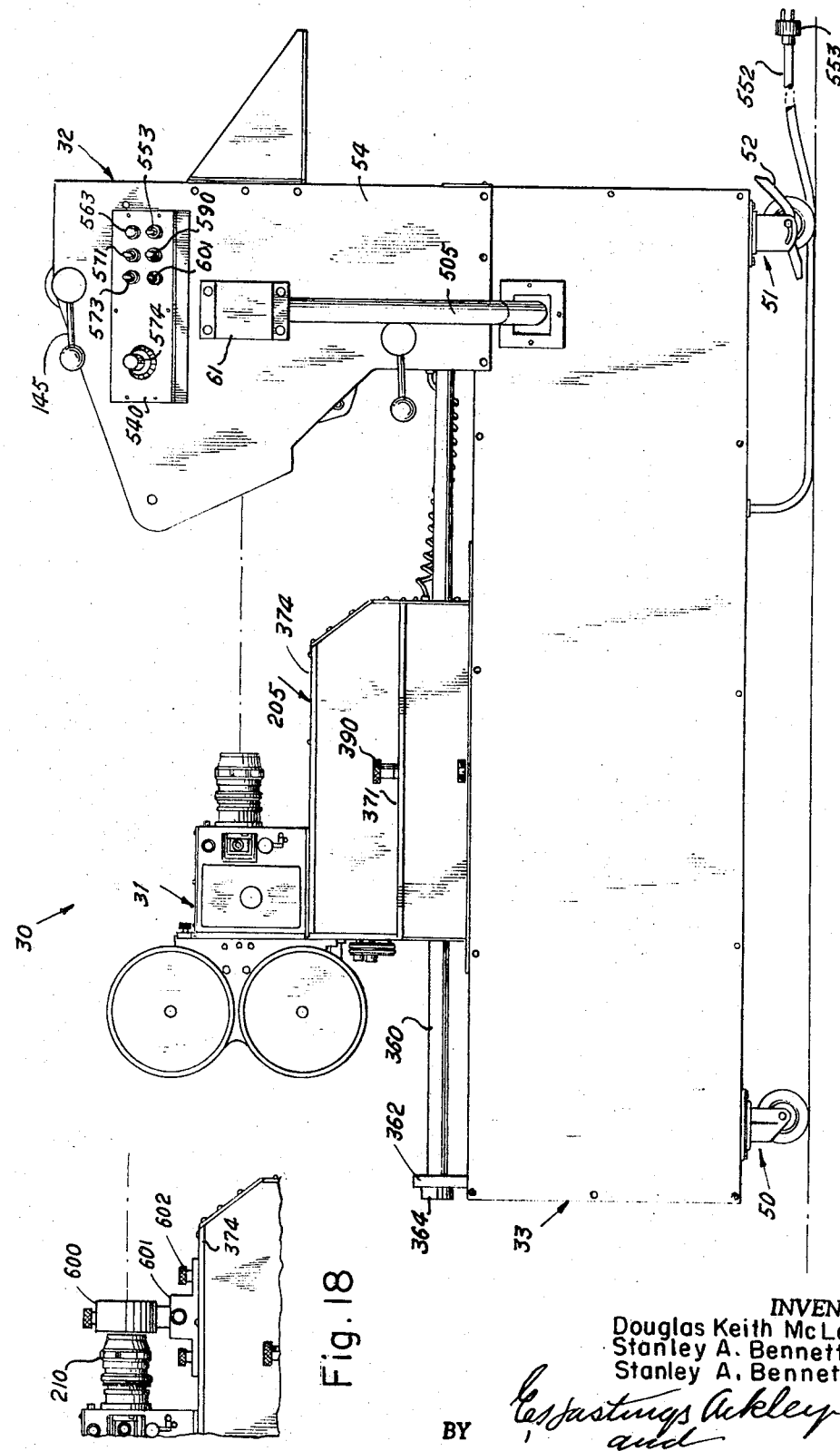
FIG. 1 is a view in elevation of one side of a photocopier embodying the invention.
FIG. 18 is a fragmentary side view of a modified optical system of the photocopier.

Referring to the drawings a photocopier 30 embodying the invention includes a camera 31 and a document conveyor mounted on a base 33. The camera is moveable along the base relative to the document conveyor for varying the length of the optical path between the camera and a document on the conveyor for adjusting the camera position for copying documents of different sizes. The operational speed of the camera is synchronized with the speed of the document conveyor at various selected rates each based upon a selected reduction between the document size and the image size recorded on the film.

In accordance with a particularly important aspect of the invention, the document conveyor includes a vacuum drum 34 to hold a document tightly on the face of the rotating drum over the area being photographed. The document conveyor has a bank of lamps 35 for illuminating a document over the photographed area as it is moved by the drum across the optical path of the camera. As explained in detail hereinafter, the drum is provided with a vacuum along its surface facing the camera so that a document is held tightly on the drum surface as it is moved by the drum across the optical path of the camera lens. The area of the drum subjected to vacuum is adjustable to accommodate a wide range document widths.

The camera preferably utilizes standard film used for conventional microfilm purposes which is driven through the camera and exposed through a slit-type aperture at a continuous predetermined rate. The film drive rate is determined by both the rate of rotation of the vacuum drum and the ratio between the size of the document area being photographed and the size of the image recorded on the moving film. For example, in a case where the image is substantially the same size as the document, the rates of movement of the film and document on the drum are the same. However, if the document is reduced to one-half size on the film, each two lineal inches of document are recorded on one inch of film and thus the film is driven at one-half the document speed on the drum. When a nine-inch (9-inch) wide document is recorded on one-inch (1-inch) film, the film is driven at one ninth (⅑) the document movement rate on the drum since nine lineal inches of document are recorded on one lineal inch of film. The camera is movable along the base 33 to adjust its distance from the drum to accommodate a wide range of document widths between a predetermined minimum and maximum. The photocopier is especially adapted to reproducing the lengthy strips of documents such as geophysical records and also may be employed for photographing a series of documents fed sequentially into the document conveyor.

The photocopier base 33 supports the document conveyor 32 and the camera 31 and also houses the prime mover for driving the vacuum drum and camera, the electrical system, and the vacuum source described in detail hereinafter. The base is basically a rectangular housing having a bottom 40, a top 41, side panels 42 and 43, and end panels 44 and 45. The base is moveably supported on one pair of conventional casters 50 secured on the bottom 40 of the housing near one end and another pair of casters 51 secured on the bottom near the other end of the housing. The casters 51 each include a pivoted locking foot 52 which is moveable by the foot of the operator to engage a supporting surface such as the floor 53 to prevent the photocopier from rolling when in operation.

The document conveyor 32 continuously feeds either a series of individual documents or a continuous strip-like document through the optical path of the camera. The conveyor is supported by vertical side support plates 54 and 55 secured along horizontal bottom portions to the opposite side panels 42 and 43, respectively, of the housing 33. The vacuum drum 34 is rotatably supported between the side plates 54 and 55 on a fixed hollow shaft 60 which extends along a horizontal axis substantially perpendicular to the side plates through and outward of each of the plates as particularly shown in FIG. 12. One end of the shaft 60 extends into a hollow mounting block 61 secured on the outer face of the side plate 54 by circumferentially spaced bolts 62. The block 61 has an L-shaped flow passage 63 to provide communication from a vacuum source as explained hereinafter and the bore of the drum shaft. An O-ring 64 supported in an internal annular recess in the block 61 seals around the shaft 60 in the block. The other end of the shaft 60 extends into a collar 65 secured on the outside face of the side plate 55 by circumferentially spaced bolts 70.

An O-ring 71 in an internal annular recess of the sleeve 65 seals around the shaft 60. A set screw 72 is threaded through the collar 65 against the outer surface of the shaft 60. The vacuum drum 34 is rotatably supported on the shaft 60 by a ball bearing 73 secured in one end closure 74 of the drum and a ball bearing assembly 75 secured in the other end closure 80 of the drum. The inner race 73a of the bearing 73 is fitted on the shaft 60 while the outer race 73b is pressed into the end closure 74. The bearing assembly 75 includes a pair of spaced ball bearings 81 whose inner races are fitted on the shaft 60 and outer races are pressed into opposite end portions of a mounting sleeve 82 which is pressed along its inward end portion into the drum end closure 80. Thus, the drum 34 is rotatable on the ball bearings around the fixed shaft 60 between the side plates 54 and 55. An annular gear wheel 83 is secured to the end face of the closure member 80 around the bearing sleeve 82 by circumferentially spaced countersunk bolts 84 for rotating the vacuum drum. The teeth on the gear wheel mesh with internal transverse teeth of a flexible endless belt 84 for driving the gear wheel and drum. A spacer 85 is disposed on the shaft 60 between the outer end of the bearing assembly 75 and the inner face of the side plate 55.

The vacuum drum 34 comprises a cylindrical perforated skin or side surface portion 90 secured along its opposite end portions to the end closure members 74 and 80 of the drum. The skin perforations are substantial in number extending over the cylindrical drum surface between the end closure members so that the entire surface of the drum between its ends resembles a screen through which communication may be established. The perforated side portion of the drum is preferably formed of a thin nickel sheet electrolytically perforated by a suitable standard procedure.

A vacuum shoe 100 is supported in fixed relationship on the shaft 60 within the drum 34 for inducing a vacuum through the perforated drum skin over an area of the drum facing the camera 31 within the optical path of the camera for tightly holding a document on the moving drum face while it is photographed. The area of the drum subjected to the vacuum is adjustable with respect to its width as measured along the axis of rotation of the drum. The vacuum shoe includes a mounting tube 101, a throat portion 102, and a diverging mouth portion 103. The base end of the throat portion is secured along the length of the mounting tube aligned with the axis of the tube. The open arcuate end of the mouth portion is supported adjacent to and spaced from the inner surface of the drum in very close relationship allowing drum rotation relative to the shoe with minimum air leakage within the drum at the shoe edges, see FIG. 4. The throat and mouth portions of the vacuum shoe are formed by T-shaped side end members 104 and 105 and internally spaced identical partitions 110. Identical top and bottom panels comprising flat throat portions 111a and bent mouth portions 111b are secured along their opposite lateral edges to adjacent facing side surfaces of the end members 104 and inner partitions 110. The vacuum shoe defines a plurality, five (5) as shown, of flow channels 113 aligned side-by-side across the shoe. Each flow channel opens through the diverging mouth of the shoe and communicates through the throat into the bore of the tube 101 through a slot 114, FIG. 12, opening at the base of the throat through the tube. The free end edges of the end members 104 and partitions 110 are curved to fit in extremely close relationship with the inner surface of the vacuum drum skin so that the drum rotates with the vacuum shoe being supported in a fixed position without actual physical contact or drag between the end edges and the inner skin surface while minimizing air communication between the various flow paths of the shoe along the inner surface of the drum to reduce loss of vacuum within the drum. The fixed drum shaft 60 is provided with a plurality of elongate slots or openings 115 aligned longitudinally along the length of the shaft in alignment with the slot 114 of the mounting tube 101. The slots 115 are longitudinally spaced so that each slot communicates with one of the flow channels 113 of the shoe. A vacuum shoe control tube 120 is rotatively disposed concentrically through the shaft 60 opening at its inward end 121a into the flow passage 63 in the mounting block 61 to provide communication from the vacuum source into the bore of the control tube when within the drum shaft. The other or outer end of the control tube is closed by a plug closure 122a having a handle 123a for rotating the control tube.

The control tube 120 of the vacuum shoe has one row of longitudinally spaced aligned slots 121, a second row of aligned slots 122, and a single slot 123. The two rows of slots and the single slot are circumferentially spaced around the tube approximately 90 degrees apart providing three positions of different degrees of communication from the control tube into the vacuum shoe. The longitudinal spacing of the slots in each of the rows is correlated with the spacing of the slots 115 in the drum shaft 60 so that when any one of the rows of slots in the adjusting tube is aligned with the slots 115 in the shaft 60 the slots in the tube 120 are in registry with a corresponding number slots 115 in the shaft. For example, when the row of slots 121 of the tube 120 is aligned with the slots 115 all five flow channels 113 of the vacuum shoe are in communication with bore of the control tube for applying a vacuum across the full width of the shoe. Similarly, when the slots 122 are aligned with the row of slots 115 only the central three flow channels of the shoe communicate with the bore of the control tube. When the tube 120 is rotated to align the single slot 123 with the row of slots 115, the slot 123 is in registry with only the center slot 115 communicating only the single center flow channel of the vacuum shoe with the bore of the control tube. The collar 65 and the closure 122a of the control tube are suitably marked to indicate the rotational position of the control tube in the drum shaft for aligning the desired slots of the control tube with the shaft slots. The control tube is rotated without removal from the shaft. Thus, the vacuum shoe is adjusted by rotation of the control tube 120 to provide a vacuum over an area of the drum extending circumferentially approximately the height of the open mouth portion of the shoe and extending across the shoe ranging from the width of the single center flow course to the combined width of all five flow courses. Though the drum rotates the vacuum area remains fixed as the vacuum shoe does not rotate. A document rotating along with the drum is therefore held by the vacuum only along the portion of the drum through which the vacuum is applied. No additional means such as a glass pressure plate is needed for holding a document on the photographed area of the drum.

Figure 4:
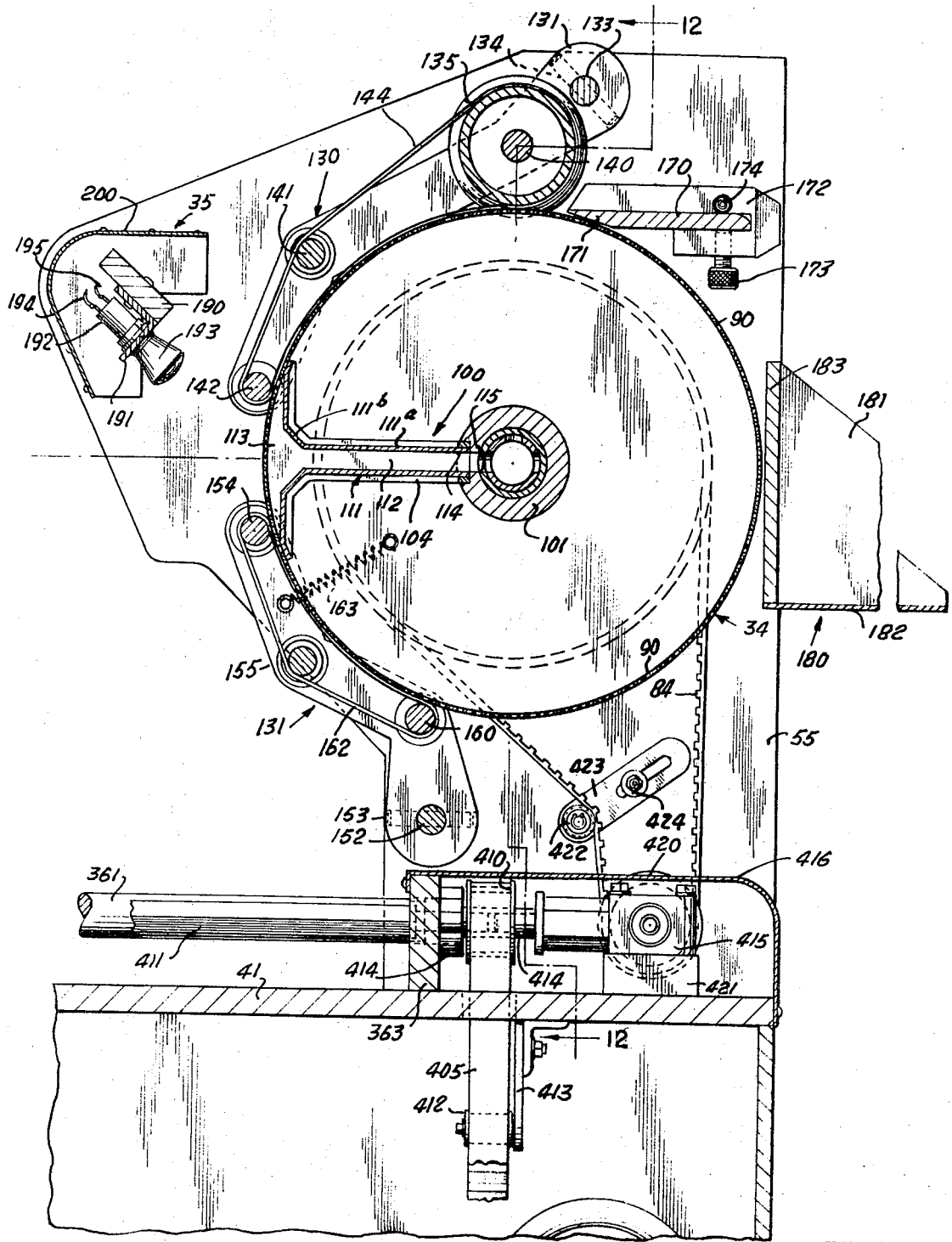
FIG. 4 is an enlarged fragmentary side view partially in section and partially in elevation taken along the line 4—4 of FIG. 3 showing the document conveyor.

The vacuum shoe is held within the drum in a substantially horizontal position, FIG. 4, by a plurality of set screws 124 threaded through the mounting tube 101 against the outer surface of the fixed drum shaft 60. A pair of Quad Ring seals 125 are disposed within internal annular recesses in the mounting tube on opposite sides of the vacuum shoe to minimize leakage along the shaft 60 within the mounting tube when a vacuum is effected in the shoe. While the vacuum shoe has been illustrated and described as having five flow courses, it will be readily appreciated that further variations may be provided in the vacuum area of the drum by providing structure having more or fewer flow courses and the corresponding slots in the control tube and mounting shafts.

A document is held snugly against the outer surface of the drum as it is fed along the drum surface to and from the vacuum area by an upper holder and quick release assembly 130 and a lower holder and quick release assembly 131, each of which is swingably supported and is biased toward the drum. Each holder assembly is quickly swingable away from the drum for releasing a jammed document.

The upper document holder 130 has a pair of identical side arms 131 and 132 supported at opposite ends of the vacuum drum between the side plates 54 and 55 on a shaft 133 extending between the side plates. Each arm is held near its upper end on the shaft 133 by set screws 134. An upper smooth surfaced roller 135 having end flanges 136 is rotatably supported on a shaft 140 having end portions extending through and secured with the arms 131 and 132. Intermediate and the lower guide rollers 141 and 142, respectively, are also rotatably supported between the arms 131 and 132. A handle 143 is secured on the end portion of the shaft 133 adjacent to the side plate 54 for pivoting the holder upwardly away from the drum. The guide rollers are identical and each has a plurality of external annular recesses spaced longitudinally along its length. The corresponding aligned recesses of the guide rollers each receives an endless tape-like belt 144 extending around the guide rollers and the roller 135. The belts 144 are distributed across the holder the full length of the drum as seen in FIG. 3. All of the belts 144 on the holder 130 are of equal length and are sufficiently long that when the assembly engages the vacuum drum the portions of the belts running directly between the roller 135 and the lower guide roller 142 are drawn taut and roll snugly around about seventy degrees (70°) of the outer surface of the drum for holding a document along the drum surface above the vacuum area. When the holder is pivoted upwardly for releasing a document the belt portions adjacent to the drum are lifted out of engagement with the drum and are somewhat slack. The surface configuration of the guide rollers aid in minimizing derangement of the belts when the pressure is lifted. If a belt is disarranged by slipping out of its guide recesses on the roller it is manually pushed back to its proper position. The belts are made up of suitable flexible material such as cloth tape. The upper holder assembly is held by gravity against the drum when not being manually lifted and held away from the drum.

The lower assembly 131 which holds a document against the drum below the vacuum area as it moves on the drum downwardly from the vacuum area is similar in construction to the upper holder and includes arms 150 and 151 at opposite ends of the drum pivotally supported on a shaft 152 rotatably supported at opposite ends through the plates 54 and 55. The arms 150 and 151 are secured to the shaft 152 by set screws 153. Upper, intermediate, and lower guide rollers 154, 155, and 160, respectively, are rotatably supported by the arms 150 and 151. All of the guide rollers have external annular longitudinally spaced recesses at corresponding positions on the rollers for holding and guiding a plurality of endless tape-like belts 162 extending around the guide rollers. The length of the belts is such that when the holder assembly is held against the vacuum drum and the upper portion of each belt between the guide rollers 154 and 160 runs snugly along the surface of the drum for holding a document on the drum surface as it moves downwardly from the vacuum area of the drum. The belts, of course, are somewhat slack when the holder assembly is pivoted downwardly away from the drum to release a jammed document. The holder assembly is biased upwardly against the drum by springs 163 connected between the arms 150 and 151 and the side plates 54 and 55 respectively. A handle 164 is secured on the end portion of the shaft 152 extending outwardly beyond the support plate 54 for manually pivoting the lower holder assembly downwardly away from the vacuum drum.

A document feed support shelf 170 is secured horizontally between the side plates 54 and 55 above the drum for guiding a document into the conveyor. The bottom face of the shelf is tapered upwardly at 171 to permit the shelf to be positioned in close proximity to the vacuum drum near the upper line of engagement of the belts 144 on the roller 135 with the drum surface. A document supported on the shelf 170 enters between the drum and the upper holder assembly belts for movement by the drum toward the vacuum area. Spaced adjustable document guides 172 are disposed on the shelf 170. Each guide is releasably locked at a desired position by a lock nut 173 threaded through the guide against the bottom face of the shelf. Each guide 172 has a roller 174 which engages the top surface of a document along its edge portion as the copy is fed into the conveyor across the shelf holding it substantially flat on the shelf. A document bin or storage shelf 180 having ends 81, a shelf 182, and a front 182 is secured between the side plates 54 and 55 for holding documents being fed into the conveyor over the shelf 170.

The bank of lights 35 for illuminating a document as it passes through the optical path of the camera on the drum is supported between the side plates 54 and 55 above the optical path toward the camera from the drum. The lamp assembly includes a mounting bar 190 secured at opposite ends to the plates 54 and 55 supporting a plurality of longitudinally spaced brackets 191 each of which supports a socket 192 holding a bulb 193 to provide the desired illumination. Each socket is connected with leads 194 and 195 to supply electrical power for the bulbs. A protective housing and reflector 200 is mounted between the plates 54 and 55 over the bulbs to protect the bulbs and related structure and to reflect the light downwardly toward the vacuum drum for illuminating the copy over the area being photographed. A sufficient number of bulbs are used to illuminate the desired area across the full length of the vacuum drum.

The camera 31, which continuously photographs material carried by the vacuum drum, includes a housing 201 for the optical photographing and viewing systems and the film drive and a film holder 202 which has an upper cylindrical chamber 203 for a film takeup reel and a lower cylindrical chamber 204 for a film supply reel. The camera is mounted on a longitudinally movable housing 205 which encloses the camera drive mechanism as explained in detail hereinafter.

Both the optical system for photographing and the through-the-lens system of the camera 31 are adapted from a standard Nikon F 35-millimeter single lens reflex camera equipped with a standard waist-level view finder. The Nikon F camera is described and illustrated in an instruction manual having a document designation (65.11.AO)B available from Nippon Kogaku K.K., Tokyo, Japan, and from photographic supply houses selling and servicing the Nikon F camera.

The Nikon F camera is suitably modified for installation in the camera 31 of the photocopier by removal of the back of the Nikon F camera body as shown at pages 8 and 9 of the reference instruction manual, by removal of its focal-plane shutter mechanism by any suitable means, or locking of the shutter at its open position, and securing a flat mounting plate 202, FIG. 7, along the base of the body by a countersunk bolt 203 threaded into the tripod socket of the camera body. The Nikon F body is supported in a vertical position by the mounting plate secured to the inner face of the side panel 203 of the housing of the camera 31 by bolts 205. The Nikon F lens 210 projects toward the vacuum drum through the front panel 211 of the camera housing 201 with the waist-level view finder 212 for viewing through the lens 210 adapted to unfold to open viewing position through the other side panel 213 of the camera housing. The view finder 212 is the standard Nikon F waist-level finder shown in FIG. 22, page 19, of the reference instruction manual. The standard release button 214 provided on the Nikon F camera extends through the front panel 211 of the housing 201 so that the lens 210 is readily removed for interchange or replacement by other lenses. One lens which has been found suitable for use in the camera 31 is the Micro-Nikkor Auto 55 mm. F/3.5 available with the Nikon F camera.

Figure 16:
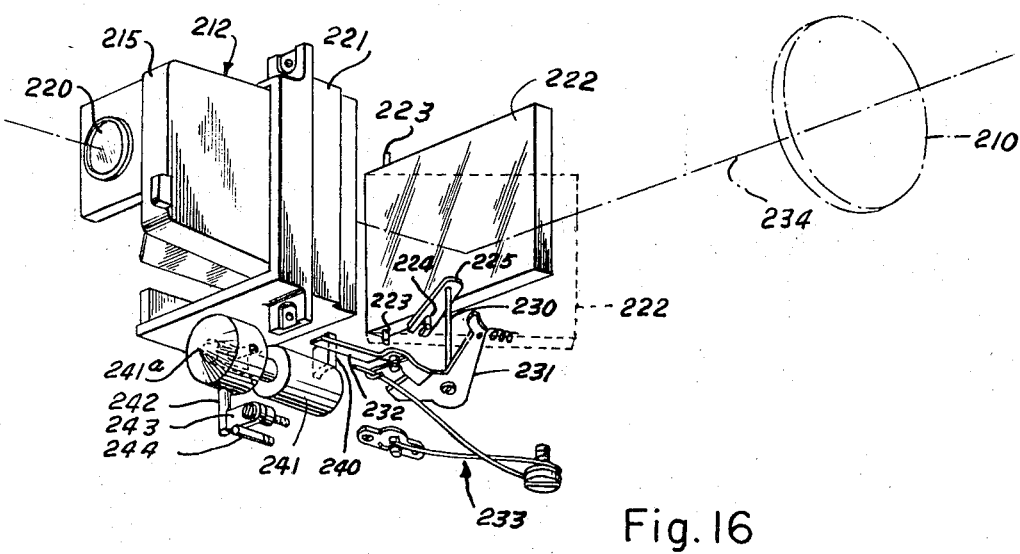
FIG. 16 is an enlarged perspective view of the major components of the through-the-lens viewing system of the camera.

The standard optical systems including the viewing system of the Nikon F camera are not altered in the installation in the camera 31 so that the view finder 212 is available for viewing a document on the vacuum drum for adjustment of the camera position and image focus of the camera lens 210. The basic functional elements of the Nikon F viewing system as adapted to the camera 31 are illustrated in FIG. 16. The view finder 212 includes a foldable hood 215 having a viewing lens 220 supported in a frame 221 mounted for folding and unfolding the hood through an opening 213a in the side panel 213 of the housing of the camera 31. A viewing mirror 222 is pivotally supported near one end of a pair of pins 223 secured with brackets, not shown, provided in the body structure of the Nikon F camera. The mirror has an operator pin 224 received in an open ended slot in a lever 225 secured on one end of a rotatable shaft 230 connected at its other end to lever 231. One arm 232 of the lever 231 is connected with a spring 233 which biases the lever 231 in a counterclockwise direction on its shaft 230 as viewed in FIG. 16 to bias the mirror in a clockwise direction on its pins 223 toward the viewing position across the optical path 234 of the lens 210 as shown in broken lines. The mirror is locked at the retracted nonviewing position illustrated in solid lines in FIG. 16 by a catch 240 on a latch shaft 241 rotatably supported through the side panel 213 of the camera housing. The head portion 241a of the shaft 241 is provided with a lock pin 242 engageable by one end of a catch 243 which is pivoted at its other end for movement between locked and unlocked position. The catch 243 is supported at its lock position against the pin 242 by a pin 244 projecting from the side panel 213. In the relative positions of the various components of the viewing system shown in FIG. 16 the catch 240 engages the arm 232 of the lever 231 for holding the viewing mirror at its retracted position against the spring 233. Manual rotation of the catch 243 in a clockwise direction away from the pin 242 releases the latch shaft 241 for counterclockwise rotation. As the latch shaft 241 moves counterclockwise the arm 232 of the lever 231 is released by the catch 240 permitting the spring 233 to rotate the lever 231 counterclockwise turning its shaft 230 so that the lever 225 rotates counterclockwise. The operating pin 224 of the mirror is moved by the lever 225 pivoting the mirror from its nonviewing position into the optical path 234 to its viewing position. At such position the operator of the photocopier may observe through the lens 220 an image on the ground-glass screen, not shown, of the view finder as reflected from the optical path 234 by the mirror. While viewing the lens 210 is adjusted to focus on a document on the vacuum drum.

After adjustment of the camera the mirror is retracted from the optical path by clockwise rotation of the latch shaft 241. The operator manually grasps the head 241a rotating it clockwise so that the catch 240 is on the shaft 241 engages the arm 232 of the lever 231 rotating the lever clockwise so that the lever 225 turns clockwise pivoting the mirror counterclockwise on the pins 223 to retract the mirror back to the nonviewing solid line posiiton of FIG. 16. As explained hereinafter, an electrical interlock, not shown, is included in the viewing system so that the film drive mechanism of the camera 31 is operative only when the viewing mirror 222 is retracted to its nonviewing position since material on the vacuum drum may be photographed only when the viewing mirror is retracted out of the optical path 234. As in the case of most through-the-lens photography, the viewing mirror prevents optical transmission of the image to the recording film when the mirror is across the optical path.

Figure 9:
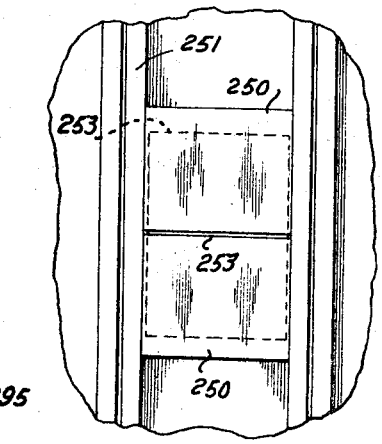
FIG. 9 is an enlarged fragmentary view in elevation taken along the line 9—9 of FIG. 8 showing the slit type aperture of the camera.
Figure 11:
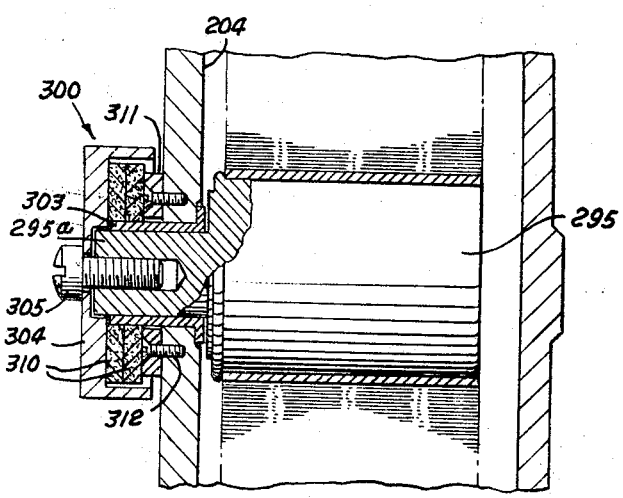
FIG. 11 is an enlarged fragmentary view in section partially broken away taken along the line 11—11 of FIG. 8 showing a drag unit for the supply reel spindle.

The Nikon F camera is further modified to accommodate it to the photocopier camera 31 so that continuous photographing can be accomplished by providing a horizontal aperture slit intersecting the lens axis in the plane of the focal plane shutter. As illustrated in FIG. 9, a pair of identical flat plates 250 are secured along the back of the camera body along the film tracks 251 in the normal film plane of the Nikon F camera spaced vertically apart to define a horizontal slit 252 which lies at the midpoint of the optical path extending the full width of the normal image area 253 to expose the film passing along the slit in the camera 31. The broken line representation 253 of the normal image size of the Nikon F camera is given only for illustration purposes to show the positioning of the plates 250 along the back of the camera body and the orientation of the aperture slit 252. One suitable aperture slit 252 was about twelve one thousandth of an inch in width (0.012 inch).

Figure 8:
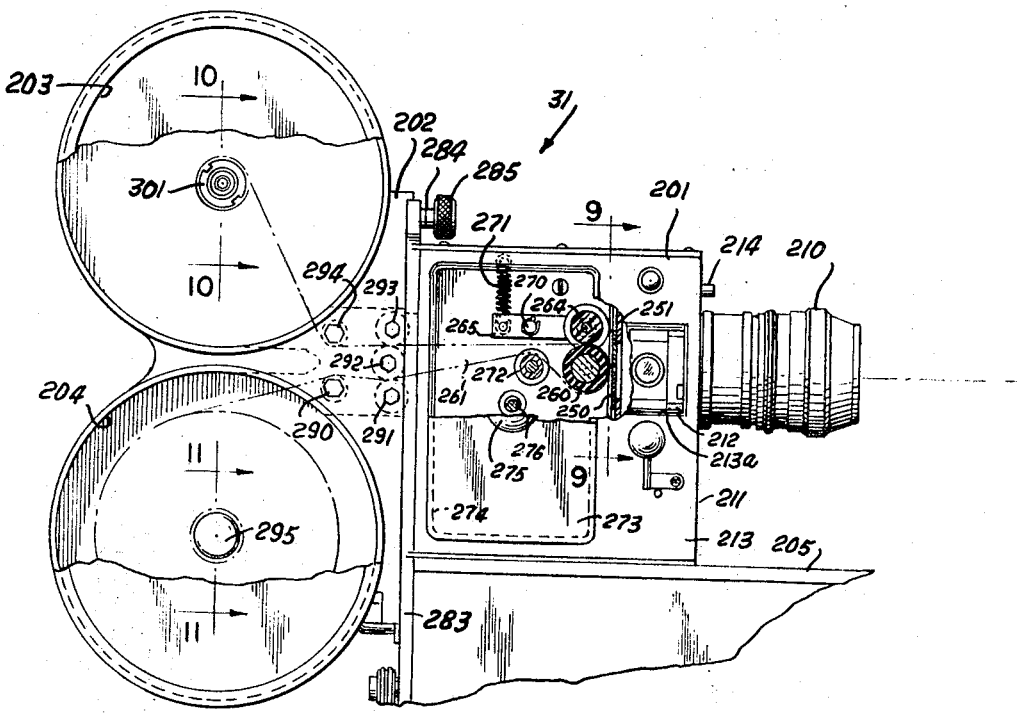
FIG. 8 is a fragmentary side view in elevation partially broken away showing the camera and a portion of the camera drive mechanism and the interior of the film holder.

The housing 201 of the camera 31 encloses the film drive system of the camera which includes a driven roller 260 supported on a shaft having a horizontal axis of rotation aligned with the slit 252 for moving strip film 261 behind the slit 252 in a vertical direction normal to the length of the slit as the image of a document on the drum is projected through the slit to the film by the lens 210. As shown in FIG. 7 the drive roller 260 is secured on a shaft connected into a drive pulley 261 and a gear 262 for a counter. The pulley 261 is turned by an endless belt 263 connected with other components of the camera drive system explained in detail hereinafter. A pressure idler roller 264 is supported on one end of a lever arm 265 pivotally supported on a pin 270. The other end of the arm 265 is connected with a spring 271 biasing the bar in a clockwise direction on the pin 270 so that the roller 264 is urged downwardly toward the drive roller 260 to the film 261 between the rollers so that the film is driven by the roller 260. Both the rollers 260 and 264 are provided with surface finishes such as rubber which enable the rollers to grip the film without scratching its surface. An idle roller 272 is supported within the housing 201 aligned with the roller 260 for holding the film 261 at a position as it is fed to the roller 260 which provides film contact with the roller 260 in excess of 180° as seen in FIG. 8.

A removable closure plate 273 is releasably secured over a rectangular opening 274 in the side panel 213 of the camera housing 201 to provide access to the drive mechanism of the camera. The access plate is held upon the housing side panel by a knob 275 threaded on a stud 276 extending from the other side of the housing.

As shown in FIG. 7 the pulley 261 connected with the drive roller 260 is disposed between an inside vertical camera housing panel 204 and a removable outer side panel 280. A suitable film footage counter 281 is secured on the outer side panel 280 connected by a shaft 282 with a gear 283 which meshes with the pinion gear 262 so that as the film is driven through the camera past the aperture slit the counter 281 records the length of the film exposed.

The film holder 202 is removably supported along the back face of the rear panel 283 of the camera housing 201 by a bolt 284 having a knurled knob 285. The film holder 202 is a standard 35 mm. Mitchell unit modified as explained hereinafter to the particular requirements of the photocopier.

The film holder 202 is provided with internal lower idler rollers 290 and 291, an intermediate roller 292, and upper idler rollers 293 and 294. The film is fed from the lower supply chamber 204 over the idler roller 290, between the idler rollers 291 and 292 into the camera housing 201 of the idler roller 272. Film is returned to the film holder from the camera housing between the rollers 292 and 293 under the idler roller 294 into the upper takeup film chamber. The film holder also includes a supply roll spindle 295 within the lower chamber 204 and connected with a drag assembly 300 supported on the outside of the film holder. The film holder also has a takeup reel spindle 301 in the upper chamber 203 connected through a slip clutch to a motor drive 302, FIGS. 2 and 10, supported on the film holder.

The supply reel spindle 295 has a reduced portion 295a rotatably supported through the wall of the lower chamber of the film holder in a sleeve 303. A cup 304 is secured to the spindle or screw 305 threaded through the center of the cup into the spindle so that the cup is rotatable with the spindle 295. Grease saturated felt washers 310 are confined within the cup against an annular ring 311 secured by a plurality of screws 312 to the outer face of the film holder around the sleeve 303. The cup rotates with the spindle 295 with the grease saturated washers confined between the rotating cup and the fixed ring 311 providing a drag resisting rotation of the spindle determined by the degree of tightness with which the felt washers are confined. The drag on the spindle tends to keep film tightly wound on the supply reel and to prevent possible unfurling or loosening of the film on the reel as film is pulled from the reel.

The takeup spindle 302 in the upper film holder chamber, as shown in detail in FIG. 10, is connected with its drive motor through a slip clutch 320 disposed within the bore of the spindle connected with the motor shaft 321. The spindle is mounted on a shaft 322 extending through a sleeve bearing 323 pressed into a sleeve 324 having a flange 325 secured by plurality of screws 330 to the outer face of the film holder lower chamber wall shown in FIG. 10. A split lock ring 323a is fitted in an external angular groove of the shaft 322 adjacent to the outer end face of the sleeve 323. The outer end portion of the shaft 322 is provided with at least one flat surface, not shown, or other suitable surface configuration to fit into the open end of the motor shaft 321 so that the motor shaft drives the spindle shaft. The spindle 302 is supported on the shaft 322 on a pair of ball bearings 331 pressed into the bore of the spindle against an internal annular flange 332 within the spindle. A spacer 333 is disposed on the shaft 322 between the inner face of the innermost ball bearing assembly and the outer end face of the sleeves 323 and 324. A lock ring 334 is secured in an external annular recess on the shaft 322 against the outer face of the outermost bearing assembly 331. The lock rings 323a and 334 on the shaft 322 hold the shaft against axial movement while permitting it to be driven by the motor. An annular spindle clutch ring 335 is disposed in the outer portion of the bore of the spindle 302 against the outer face of the internal annular flange 332. The clutch ring is held against rotation in the spindle by a lock pin 340. A shaft clutch ring 341 is disposed within the bore of the spindle around the shaft 332 biased against the clutch ring 335 by a spring 342 confined around the shaft against the clutch ring 341 by an outer retainer ring 343. The retainer ring 343 is held on the shaft 322 by a split lock ring 344. The spring 342 engages an external annular flange 341a on the clutch ring 341. The clutch ring 341 is held against rotation relative to the shaft 322 by a pin 345 secured through the clutch ring into an elongate slot 350 in the shaft 322 allowing the pin to move axially of this shaft so that the clutch ring 341 is rotated by the shaft 322 but is free for limited longitudinal movement on the shaft allowing the spring 342 to bias the ring 341 against the ring 335 to drive the spindle 302 but allow the spindle to slip on its shaft. Thus, the takeup spindle drive motor 302a drives the spindle 302 through the clutch assembly 320 with the clutch assembly providing for slippage of the takeup spindle as determined by the pressure exerted between the clutch rings for providing substantially constant tension in the film being wound on the takeup reel without breaking the film.

The housing 205 which supports the camera 31 also encloses a portion of the apparatus which transmits the power to the camera to drive the film. The housing 205 is supported for movement on the base 33 on a pair of parallel spaced support rods 360 and 361 secured between a horizontal member 362 at the camera end of the base 33 and a horizontal support member 363 secured on the base 33 near the vacuum drum end. The rods 360 and 361 are held in their supporting members 362 and 363 by annular retainers 364 suitably secured on the end portions of the rods projecting outward of their support members. The housing 205 has a lower compartment 205a defined by side panels 365 and 370 and a top panel 371 which also serves as a floor or base for a small upper compartment 305b of the housing defined by side panels 372 and 373 and a top panel 374 on which the camera 31 is mounted.

The housing 205 is slidably supported on the bars 360 by a split block 380 which supports and releasably locks one side of the housing on the bar 360. The housing is supported along its other side on the bar 361 on a front block 381 and a rear block 382. A suitable bearing assembly 383 is secured in each of the blocks 381 and 382 around the rod 361 for movement along the rod. Each bearing includes an inner race having plurality of circumferentially spaced balls, not shown, engaging the rod so that the bearings roll along the rod. The blocks are suitably secured to the housing side panel 370 and the top panel 371. The support and locking block 380 is made of a suitable flexible material such as plastic provided with a hole or bore 384 opening to a horizontal slot 385. An adjusting bolt 390 is supported through the top panel 371 and a bore 391 of the block above the slot 385 somewhat larger than the screw 390. The bolt 390 is threaded into the portion of the block below the slot 385 so that the rotation of the bolt forces the portion of the block below the slot upwardly to grip the rod 360 for locking the housing 205 at a desired position along the rods 360 and 361. When the bolt 390 is loosened the housing and camera 31 along with the camera drive system are movable along the rods.

Both the vacuum drum 34 and the camera 31 are driven from a common motor 400, FIG. 2, secured on a platform 401 supported on suitable shock mounts 402 connected to the floor 40 in the base 33. The motor is coupled to a reduction gear unit 403 having a pulley 404 which drives an endless belt 405 running over another pulley 410, FIG. 4, on one end portion of a longitudinal drive shaft 411 supported on the top 41 of the base 33 between the rods 360 and 361. The drive shaft is rotatably supported at opposite ends by the horizontal support members 362 and 363 which also support the rods 360 and 361. The pulleys 404 and 410 are provided with gear type teeth and the belt 405 has internal transversely extending teeth meshing with the gear teeth of the pulleys for non-slip drive of the shaft 411 from the motor. An idler roller 412 is rotatably supported from a hanger bracket 413 secured to the bottom of the panel 41 for adjusting the tension in the belt 405. The smooth back surface of the belt 405 rolls along the idler roller 412. The end portion of the shaft 411 extending through the support member 363 is rotatably supported on a bearing 414. The pulley 410 is supported jointly on one end portion of the drive shaft 411 and a coaxial shaft 414 of a right-angle gear drive unit 415 having a driven shaft provided with a gear type drive pulley 420. The pulley 420 drives the belt 84 for rotating the vacuum drum. The right angle drive unit is mounted on a block 420 secured on the top panel 41 of the base 33. A tension adjusting idler roller 422 is supported on a bracket 423 adjustably secured by bolt 424 to the inside face of the side plate 55. The roller 422 engages the smooth backside of the belt 84 and the tension in the belt is adjusted by movement of the bracket 423 supporting the roller. A protective cover 416 which also serves as a lower document shelf is secured over the drive unit 415 and related apparatus. The cover extends from the support 363 to the end edge of the panel 41.

The camera 31 is driven from the drive shaft 411 which is rotated simultaneously with the input shaft 414 for the vacuum drum. As shown in FIGS. 6 and 7, the drive shaft 411 is square in cross section over a major portion of its length to provide driving surfaces for driving the camera at any location of the camera 31 and its support housing 205 along the length of the drive shaft. Power is transferred from the square drive shaft 411 through a power takeoff assembly 430, FIGS. 5, 5A and 6. The power takeoff assembly has an annular gear 431 having gear teeth 432 secured on a sleeve 433 around the drive shaft and rotatably supported from the mounting block 381 in a pair of ball bearings 434. The sleeve 433 has a bore 435 substantially larger than the maximum cross sectional measurement of the square drive shaft 411 so that the sleeve is freely movable along the length of the shaft. The gear 431 is secured on an enlarged portion 433a of the sleeve which has a pair of axially extending transversely spaced fingers 440 positioned on opposite sides of this sleeve portion 433a. Each finger 440 pivotally supports an arm 441 which is bifurcated along opposite end portions. A pair of laterally spaced rollers 443 is secured on a pin 444 to the free end of each arm 441. The rollers 441 on each arm are spaced apart sufficiently to engage adjacent side faces of the drive shaft 411 spanning the longitudinal corner edge of the shaft extending between the rollers. The rollers on the arm span opposite corner edges of the shaft and the arms are biased toward each other by continuous elastic bands 445 connected over end portions of the roller pin so that the two opposed pairs of rollers grip the flat longitudinal faces of the drive shaft 411 and may roll along the shaft. The only mechanical connection provided between the power takeoff assembly and the square drive shaft is through the pairs of the rollers 443. The shaft 411 rotates the power takeoff assembly driving the annular gear 431. The coupling between the power takeoff assembly and the shaft is effective at any longitudinal location of the assembly along the length of the shaft. Since the only contact between the assembly and the shaft is through the rollers 443, the housing 205 is readily moved longitudinally along the length of the shaft with the rollers 443 remaining engaged with the flat side surfaces of the shaft as the power takeoff assembly is rolled along the length of the shaft. The rotation of the power takeoff assembly drives the chain 450 which meshes with the teeth 443 on the annular gear.

The endless chain 450 extends from the gear 443 upwardly through a transverse slot 460 in the housing panel 371 into the upper compartment 205b and over a driven gear wheel 461 secured on a horizontal drive shaft 462. An idler gear 463 engages the outside of the chain between the driving gear 443 and the driven gear 461 for adjusting the tension in the chain. The idler gear is supported on an adjustable bracket 464 secured on a vertical mount 465 supporting one end of the shaft 462. The drive shaft 462 is rotatably supported by the mount 465 and a mount 470 disposed along one end portion of the drive shaft on opposite sides of the gear 461 and a mount 471 disposed along the opposite end portion of the drive shaft. The shaft 462 is coupled through a magnetic clutch 472 to a shaft 473 rotatably supported through a vertical amount 474 and extending through a back panel 376 of housing 205. A dual pulley 475 is mounted on the end of the shaft 473 outward of the panel 376. The magnetic clutch is supported from the mount 471 and is a suitable standard clutch such as a Warner model 1-SF160CL. The several mounts supporting the shafts 462 and 473 are each provided with suitable shaft bearings, such as ball bearings or the like. A pair of endless belts 480 extend from the end pulley 476 over a pulley 481 mounted on the end of a shaft 482 supported by vertical spaced mounts 483 and 484 secured on the housing panel 371. The shaft 482 is laterally spaced from and is parallel to the shaft 473. A pulley 485 is supported on the other end portion of the shaft 482 for driving the belt 263 which extends over the driven pulley 261 connected with the film drive roller 260 of the camera 31. The belt 263 passes between the pulleys 485 and 261. The belt 263 runs over a pair of vertically spaced idler pulleys 490 and 491 supported on a vertical mount 492 secured on the panel 371 between the shafts 473 and 482. The lower idler pulley 491 lies in a plane which is upwardly divergent from the mount 490 to facilitate the 90-degree turn in the belt 263 so that the belt drives the pulley 261 in a plane perpendicular to the plane of the drive pulley 485. The lower edge of the idler pulley 491 is aligned with the lower edge of the pulley 485 so the belt passes under both pulleys 485 and 491 extending upwardly from the pulley 491 out of the plane of the pulley 485. The portion of the belt 263 extending from the pulley 485 initially engages the idler pulley 491 in the same plane as the drive pulley 485 while the angular position of the lower pulley 491 permits the belt to extend upwardly to the driven pulley 261 without interference with the portion of the belt passing from above the pulley 485 under the upper idler pulley 490 and upwardly to the other edge of the pulley 261.

Thus, the power is taken from the square drive shaft 411 through the power takeoff assembly 430 at any position along the length of the square portion of the drive shaft for driving the chain 450 which rotates the shaft 462. When the magnetic clutch 472 is activated, the shaft 473 is driven and through the pulleys 475 and 481 and belts 480 drives the shaft 482 and the drive pulley 485. By means of the belt 263 the drive pulley 485 drives the pulley 261 of the camera to drive the film through the camera between the supply and the take-up reels. When the magnetic clutch 472 is disengaged the drive system through and including the shaft 462 rotates while the shaft 473 through and including the camera film drive mechanism remain motionless.

As previously explained, the film drive speed of the camera is varied in accordance with the demagnification ratio depending upon the distance of the camera from the document photographed. The speeds of rotation of the drive shaft 411 and the shafts 462 and 473 are constant throughout all of the operating ranges of the camera. The variations in the camera speed are obtained by the relationship between the driving pulley 475 on the outer end of the shaft 473 and the driven pulley 481 on the outer end of the shaft 482. A plurality of sets of pulleys 476 and 481 and belts 480 are provided for the various desired camera speeds. The only alteration in the camera required for any change of speed of operation is the removal of the externally positioned pulleys 475 and 481 and belts 480 and replacement of such components with pulleys and belts adapted to provide the desired camera speed. The accessibility of the pulleys and belts along the outside back of panel 376 of the housing permits ready, quick changes of camera speeds without other alteration or adjustment in the camera drive system.

The vacuum source for the vacuum drum of the document conveyor is provided by a vacuum pump 500 which is a standard commercially available Electrolux (Hospital Model) vacuum cleaner secured by a pair of releasable cables or straps 501 to a bed 502 mounted on the floor panel 40 of the photocopier base 33. The vacuum cleaner is covered by a blanket of foam rubber or fibreglass 503 over which the straps 501 extend for sound insulation purposes. The standard suction hose 504 of the vacuum pump is connected from the pump to a conduit 505 secured through the side wall 42 of the base housing 33 and extending upwardly into the block 61 on the side plate 54 communicating through right angle flow passage 63 in the block to the vacuum shoe of the drum. A ring seal 510 in an internal annular recess of the header seals around the end portion of the conduit 505 in the block 61.

Figure 17:
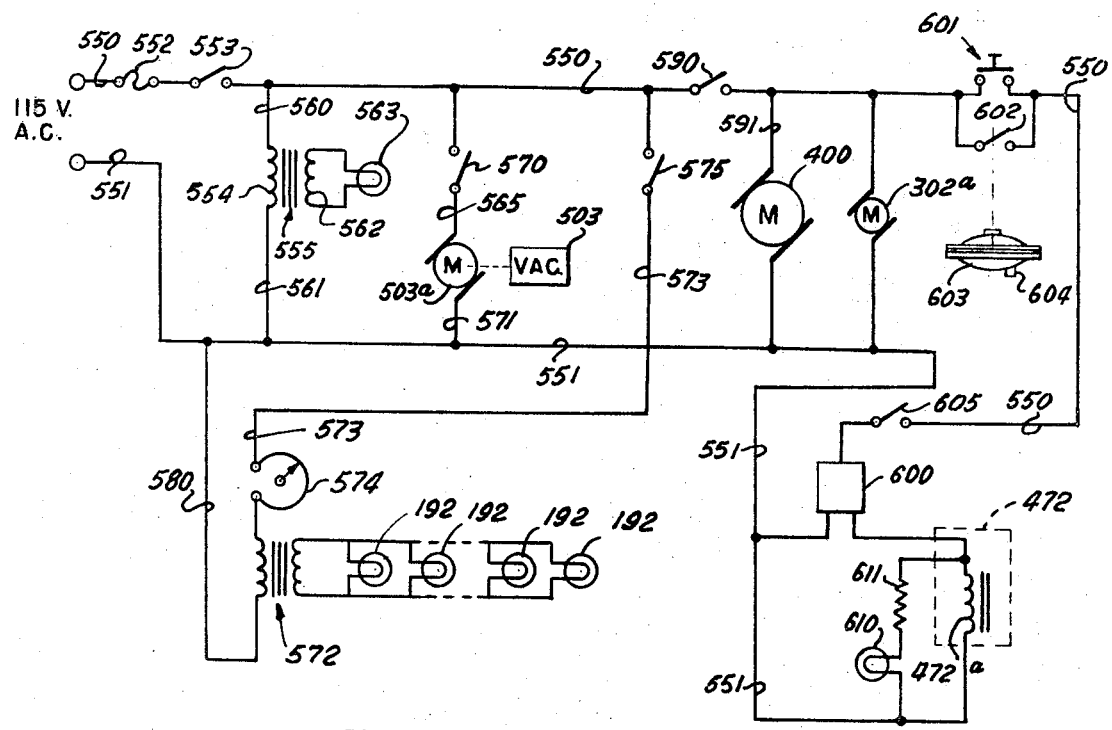
FIG. 17 is a schematic wiring diagram for the drive and control systems of the photocopier.

The electrical and control systems of the photocopier are schematically illustrated in FIG. 17. Certain components of the systems are also illustrated in other figures of the drawings. A major portion of the electrical wiring has been deleted from the various views for purposes of simplification. A pair of conductors 550 and 551 are enclosed in a suitable flexible conduit 552 provided with a plug 553 for connection with a source of alternating current power. The principal controls, particularly those manually manipulated during operation of the photocopier, are located on a control panel 540 secured at a convenient height and angle for easy observation and manipulation on the side plate 54. The primary side 554 of a transformer 555 is connected on one side by a line 560 to the line 550 and on the other side by a line 561 to the line 551. The secondary 562 of the filament transformer is connected to a pilot light 563 positioned on the control panel to indicate the availability of power in the system. The motor 503a of the vacuum pump 503 is connected on one side by a line 565 including a switch 570 to the main line 550 and on the other side by a line 571 to the main line 551. One side of the primary of a filament transformer 572 is connected by a line 573 through an intensity control unit 574 and a switch 575 to the line 550. The other side of the primary of the transformer 572 is connected by a line 580 to the main line 551. The intensity control unit 574 is a standard silicon control rectifier dimmer circuit. The secondary of the filament transformer 572 is connected to the bank of parallel illuminating lamps 192. The main line 550 includes a switch 590 located on the control panel for controlling the power to the camera and vacuum drum system drives. The motor 400 for both the vacuum drum and the camera drives is connected on one side by a line 591 to the main line 550 and on the other side by a line 592 to the main line 551. The film take-up reel motor at 302a is connected on one side by a line 593 to the main line 550 and on the other side by a line 594 to the main line 551. The coil of the magnetic clutch 472 of the camera drive system is connected on one side through a power supply 600 to the main line 550. The other side of the magnetic clutch coil and the other side of the power supply 600 are connected with the main line 551.

The main line 550 from the switch 590 to the power supply 600 includes a manual button-type switch 601 and a parallel switch 602 actuated by a vacuum unit 603 connected by a small conduit tube 604 into the conduit 505 which communicates with the flexible intake conduit 504 of the vacuum pump. The switch 601 is located on the control panel and is spring biased to an open position. The switch 501 is closed to activate the camera drive until a sufficient vacuum is developed to actuate the unit 603 for holding the vacuum switch 602 closed, as explained in greater detail hereinafter. The vacuum switch is basically a safety or economy feature which precludes filming when insufficient vacuum exists in the drum to hold a document on it. The vacuum switch 602-603 is a standard available unit manufactured by Columbus Electric Manufacturing, Model 3.00JH4B026 SPDT. The main line 550 leading to the lower supply 600 also is connected through a microswitch 605 located in the camera housing 205 coupled with the latch 241 of the view finder so that the microswitch is open when the viewing mirror is in the viewing position to allow the camera film drive to operate only when the viewing camera is at its retracted, nonviewing position providing safety means which prevents camera operation when an image cannot be projected from the lens to the film. The power supply 600 provides a 90-volt D.C. current on the coil 472a of the magnetic clutch. The magnetic clutch employed is a Warner I–SF160CL having a power supply 600 which is a Warner 5400–24 control which includes a rectifier to convert the current supply to the clutch to 90 volts D.C. A pilot light 610 is connected on one side through a resistance 611 to one side of the clutch coil 472a and on the other side to the main line 551. The pilot light is located on the panel side of the camera housing 205 to provide a visual indication of whether or not the magnetic clutch is activated and the camera drive mechanism operating.

Preparatory to operation of the photocopier the film 261 is loaded into the camera 31. The side closure plate 273 is removed and a reel of unexposed film is placed on the spindle 295 in the lower chamber of the film holder 202 and a takeup reel is positioned on the spindle 301 in the upper film chamber 203. The film is threaded from the supply reel around the drive and idler rollers of the camera and film holder. The film extends over the rollers 290, 291, and 272, around the roller 260 under the drive roller 264. The film runs under the rollers 293 and 294 to the takeup reel. Preferably, the camera is run for a brief period as explained hereinafter to insure proper threading; and after the side closure plate is replaced on the camera housing, several feet of film are run to insure that the film which became fogged during loading is moved to the takeup reel and fresh unfogged film is ready for photographing. The camera drive system is operated by the closure of the main system switch 553 and the switch 590 which connects the drive motor 400 and the takeup reel motor 302a across the main line. The microswitch 605 is closed by positioning the viewing mirror 222 at its retracted position and locked by the latch 241, FIG. 16. The switches 570 and 575 to the vacuum and illuminating system remain open though the drum begins rotation when the switch 590 is closed. The takeup reel motor drives the takeup reel through the slip clutch to pull the film taut. The clutch is set to slip before sufficient force is exerted on the film by the takeup reel to break the film. When threading the camera and winding the fogged film on the takeup reel, the camera drive is operated after closure of the switches 553 and 590 and retraction of the viewing mirror to close the switch 605, by pressing the push-button switch 601. As long as the switch 601 is held depressed the camera drive operates to turn the roller 264 driving the film through the camera. So long as the vacuum system is not operating, or, if operating, has not developed sufficient vacuum to close the vacuum switch 602, the camera drive is operative only when the switch 601 is held closed.

After loading the camera, the camera on the housing 205 is moved to the desired location on the rods 360 and 361 of the drive shaft 411 as determined by the width of the document on the vacuum drum to be photographed. The camera is located by alignment of the index marker 376 on the housing side panel with the scale 377 on the photocopier base. The document to be photographed is placed on the shelf 182, the guides 172 are adjusted for the proper width of the document, and the document leading end is manually fed into the document conveyor over the shelf 170 between the document guides, the side edge portions of the document being moved along the shelf 170 under the rollers 174. The vacuum system of the drum is started by closing the switch 571 on the control panel so that the motor 503a of the vacuum pump 503 is turned on imposing a vacuum through the flexible hose 504 of the conduit 505 into the vacuum drum shaft through the flow passage 63 of the block 61. The control tube 120 of the vacuum drum is rotated to align the desired slots with the slots 115 in the drum shaft 60 in accordance with the width of the document. For example, if the document is of maximum width for which the photocopier is designed, the five vacuum control tube slots 121 are aligned with the slots 115 in the drum shaft so that a vacuum is induced through the vacuum shoe 100 across its full width comprising its five flow channels 113. The leading edge of the document is inserted between the drum surface and the belts 144 of the upper holder assembly 130. As soon as the leading edge of the document is firmly between the drum surface and the belts 144, the counterclockwise rotating drum moves the document along on its surface under the belts 144 downwardly to the vacuum area along which the document is held tightly against the drum face as the drum moves it farther downwardly beneath the belts 162 of the lower holder assembly 131.

As soon as the leading end portion of the document is firmly held by the lower pressure assembly against the drum, the drum drive system is stopped by opening the switch 590 for focusing the lens 210 of the camera on the document drum. The vacuum system is left operating so that the document is held tightly on the drum in the optical path of the lens. The viewing lens 222 is moved into the lens optical path by lifting the latch 243 rotating it out of engagement with the handle 244 of the mirror catch which then is released to rotate counterclockwise so that the catch 240 is disengaged from the lever 232. The spring 233 rotates the lever 231 counterclockwise on the shaft 120 pivoting the mirror 222 clockwise on its pins 223 into the optical path of the camera lens. The image as viewed by the lens 210 is reflected by the mirror to a ground-glass screen in the viewfinder. The ground glass screen is observed by the operator through the lens 220 on the viewing hood. The camera lens 210 is adjusted until a sharp image is seen on the ground-glass screen. The focusing of the camera lens is preferably done with the bank of illuminating lights 192 turned on by closing the switch 573 and adjusting the intensity of illumination to the desired level by the control knob of the unit 574. After focusing of the lens 210, the viewing mirror is retracted and locked by the latch 241 and the viewing hood 212 is folded into the camera housing. The retraction of the mirror closes the microswitch 605 is that the camera drive may be operated when desired.

The proper speed for the camera film drive is determined in accordance with the width of the document to be photographed, as already explained. The proper drive pulleys 475 and 481 and belts 480 are selected and installed on the ends of the shafts 473 and 482 to provide the correct camera film drive rate relative to the vacuum drum drive rate for the width of the document being photographed.

The switch 590 is closed to start the vacuum drum rotating and operate the camera drive for driving the film through the camera. If the vacuum system has been left in operation during the various adjustments to the camera, as already explained, sufficient vacuum should be developed in the system for the vacuum switch 602 to be closed as indicated by the pilot light 610. However, if for any reason the vacuum system has not been left functioning or has not reduced the pressure in the system to a sufficient level to activate the vacuum switch, it will be necessary to depress the manual button switch 601 when the switch 590 is closed and hold this button down until the pressure in the vacuum system has been reduced sufficiently to close the vacuum switch. Generally, the button will need to be held down only a few seconds for the vacuum switch to close.

With the photocopier operating to continuously photograph the document being fed through the document conveyor the document is pulled upwardly up from the storage shelf 180, across the shelf 170, around the drum beneath the holder assembly 130, across the vacuum area, along the drum under the lower holder assembly belts 162, and ejected from the conveyor across the lower document shelf 416. As the document is driven by the vacuum drum across the vacuum area of the drum in the camera optical path, the document is held tightly on the drum surface and the image of the illuminated document is continuously projected through the aperture slit 252 of the camera to the film being driven past the slit on the roller 260. The image of the document is recorded on the moving film without blur or distortion due to the synchronized speed of the drum and camera. As the trailing edge of the document moves along with the drum below the vacuum area the reduction of the pressure within the vacuum system due to the absence of the document over the vacuum area permits the pressure in the vacuum system to increase above the level at which the vacuum switch 603 is held closed so that the vacuum switch is moved to its open position causing the camera film drive to stop operating. This safety feature not only cuts the camera off at any time the vacuum is lost to avoid film wastage, but also permits an operator to place a long strip document in the photocopier leaving the photocopier running until it has completely processed the document at which time the camera drive will cease operating as the document passes out of the apparatus.

After the photocopier is initially adjusted for a particular document additional documents of substantially the same width may be sequentially fed into the apparatus without readjustment of either the lens focus or the film drive speed. As the trailing edge of each document enters the conveyor the operator inserts the leading edge of the next document into the conveyor, as already explained. If each succeeding document is inserted closely enough to the document in the conveyor immediately ahead, the vacuum switch probably will not be opened. To insure that the camera is not stopped between documents the button 601 may be depressed as each document leaves the vacuum area and the next document enters it. Short documents as well as those in strip form may be processed by the photocopier with each document being manually fed by the operator into the conveyor.

At any time a document of a different width is to be processed by the photocopier, the distance of the camera from the photographed area of the vacuum drum is adjusted, the speed of the camera is adjusted, and the vacuum area of the drum is changed by the control tube 120 as already explained.

In the processing of documents such as geophysical records on which certain scientific data is recorded in the form of continuous tracings it is often desired that the longitudinal scale of the tracings be altered while holding the original lateral scale for certain visual examination purposes. Generally, the records are lengthened by a predetermined ratio. The photocopier may be modified in either of two ways to accomplish the desired distortion or lengthening of a document. The aperture slit 252 of the camera may be reduced to a very narrow width on the order of about three one thousandths of an inch (0.003 in.) and the camera film drive speed increased relative to the copy speed so that the length of the film along which a document is photographed is proportionately increased and the narrowing of the slit eliminates blurring of the image projected on the film. For example, in normal operation of the camera photographing of a four-inch (4-in.) wide record on one inch (1-in.) film it would require operation of the camera at a speed to move the film at one fourth (¼) the rate of document movement. If it is desired that the effective length of the record be doubled such a record when processed on a photocopier having a narrowed operative slit, the camera is operated at only one-half (½) the speed of the document so that each four inches (4 in.) of document length is recorded on two inches (2 in.) of film length while the four-inch (4-in.) width of the document is recorded on the 1-inch width of the film as usual. When such an altered film record is used to produce a positive copy of the document, the effective length of the record is twice as long as the original record due to the predetermined distortion introduced during the filming of the record in the photocopier.

Another method of introducing predetermined distortion into the film copy of a geophysical record is by use of a modified optical system illustrated schematically in FIG. 18. An anamorphic lens 600 is supported on a mount 601 releasably secured by bolts 602 to the top panel 374 of the housing 205 in front of the camera lens 210. The lens 600 includes an optical element having a cylindrical surface oriented along a vertical axis for effectively increasing the field of view of the camera in a lateral direction while not affecting its vertical field of view so that the relationship of the image projected on the film through the combination of the camera lens 210 and the anamorphic lens 600 is altered from the copy being photographed. For example, in photographing a four inch (4 in.) wide record on one-inch (1-in.) wide film, at the normal location of the camera 31 the effective reduction between the size of the document and the size of the photographed image is four times so that a four-inch (4-in.) wide document is reduced to a one inch wide image on the film while the height of the image on the film also is one fourth the height of the document viewed by the camera. When the anamorphic lens 600 is used, however, and the camera is positioned to reduce the four inch copy to the one-inch (1-in.) width of the film in a lateral direction, the vertical view of the camera may encompass only a two-inch (2-in.) length of the document being photographed so that the camera records only half the copy length it would record without the use of the anamorphic lens. When a positive copy of the photographed record is produced from the film using the anamorphic lens, the length of the document is effectively doubled while retaining the original scale across the width of the record and thus the proportions of the record as originally made are altered with the tracings on the record being extended twice the length of their initial recording. It will be obvious, of course, that the degree of distortion effected by the anamorphic lens depends upon the characteristics of the lens. The net effect of the use of the anamorphic lens is that the camera 31 is positioned and its speed adjusted for photographing based on the vertical axis along which there is no distortion of the image produced on the film by the lens while the image seen laterally is compressed on the film depending on the characteristics of the anamorphic lens and thus when a copy of the film record is enlarged based on the lateral condensing or distortion of the image the net result is an expansion in the vertical direction so that the geophysical record is effectively lengthened. The degree, of course, of lengthening depends on the characteristics of the lenses with which the copy is photographed.

It will now be seen that a new and improved photocopier for continuous reproduction has been illustrated and described including a camera, a document conveyor having a rotatable vacuum drum for holding a portion of the document being photographed tight against the drum surface while moving it across the camera optical path, a support for the camera movable to different locations relative to the drum, and a drive mechanism for the camera and drum for driving the camera at different locations relative to the drum at speeds synchronized with the drum speed. In accordance with the invention, the vacuum drum of the document conveyor is adjustable to accommodate various document widths and is connected with a vacuum source including a vacuum actuated switch which cuts the camera off when there is not sufficient vacuum to hold a document on the drum over its vacuum area in the optical path of the camera.

It will be seen that the film in the camera is exposed through a slit type aperture and is run at a continuous rate proportional to the rate of movement of a document on the vaccum drum. It will be further seen that a viewing system is provided for observing a document on the drum through the lens of the camera for properly locating the camera and focusing its lens to photograph the desired area of a document. It will also be seen that the camera film drive mechanism includes a power take-off assembly movable along the length of a rotatable drive shaft for driving the camera at any desired location along the length of the shaft.

It will be further seen that the document conveyor includes upper and lower quick release type document holders engagable with the rotatable vacuum drum above and below the vacuum area of the drum for holding a document on the drum for conveyance on the drum toward and away from the vacuum area of the drum. It will also be seen that the holders are quickly swingable out of engagement with the drum for releasing a jammed document moving with the drum.

It will be further seen that a modified form of the photocopier is adapted to record an image of a document in a predetermined distorted manner for altering the original dimensions of the document as by lengthening the document while retaining its original width.

The foregoing description of the invention is explanatory only, and changes in the details of the construction illustrated may be made by those skilled in the art, without departing from the spirit of the invention.

What is claimed and desired to be secured by Letters Patent is:

1. A photocopier comprising: an optical system for focusing light rays from an object surface to an exposure plane; means for supporting and moving material to be copied along said object surface including a perforated rotatable drum for holding and moving said material, said drum having a surface area within the optical path of said optical system; means supported at a fixed position within said drum for imposing a vacuum through the perforations of said drum as said drum is rotated, said vacuum being applied through said drum over an area variable between predetermined minimums and maximums, including a shoe having a plurality of flow channels; conduit means communicating with said flow channels; control means for communicating said conduit means with selected ones of said flow channels for varying the area of said drum subjected to said vacuum; and means for supporting and moving image recording material along said exposure plane for receiving and recording light rays from said material to be copied.

2. A photocopier comprising: an optical system for focusing light rays from an object surface to an exposure plane; means for supporting and moving material to be copied along said object surface including a perforated drum having a surface area within the optical path of said optical system subjected to a vacuum for holding said material to be copied along said object surface as said material is moved by said drum; means for supporting and moving image recording material along said exposure plane at a predetermined rate relative to the rate of movement of said material to be copied on said drum along said object surface for receiving and recording light rays from said material to be copied; means providing an aperture slit disposed in said optical path between said object surface and said exposure plane in a plane parallel with said exposure plane, the long dimension of said slit being perpendicular to the direction of movement of said image recording material; and the distance between said object surface along which said material to be copied is moved on said drum and said exposure plane being adjustable between a predetermined minimum and a maximum to accommodate various size material for copying.

3. A photocopier as defined in claim 2 including drive means for driving said material to be copied on said drum and said image recording material from a common prime mover, said drive means including a rotatable shaft from which force is transmitted to drive said image recording material at a plurality of locations along said shaft.

4. A photocopier as defined in claim 3 including means associated with said drive means for driving said image receiving material along said exposure plane operable responsive to a predetermined pressure within the vacuum system for said drum whereby said means for moving said image recording material is activated only when material to be copied is disposed along said object surface of said vacuum drum.

5. A photocopier as defined in claim 4 including means for illuminating material to be copied over an area within the optical path of said optical system.

6. A photocopier comprising: a camera having an optical system including a lens and an aperture slit across the axis of said lens disposed normal to the direction of movement of film in said camera for continuous exposure of said film along an exposure plane disposed perpendicular to the axis of said lens in a plane parallel to the plane of said slit and on the opposite side of said slit from said lens; said camera including film storage and transport means for moving film in image receiving relation with said slit along said exposure plane; a document conveyor for supporting a document to be copied by said camera and moving said document along an object surface intersecting the axis of said optical system of said camera whereby an image of said document is projected by said optical system through said slit to film moving along said exposure plane, said document conveyor including a rotatable perforated drum for moving a document being copied by said camera across the optical path of said camera as said drum rotates, said document being held against the outer surface of said drum and being movable along with said surface as said drum rotates; vacuum means disposed at a fixed position within said drum for imposing a vacuum through the perforated wall of said drum for holding said document on the surface of said drum over the object surface of said drum within the optical path of said camera including a vacuum shoe having a plurality of flow channels communicating at one end with flow passage means provided within said drum connected with a source of vacuum, said flow channels communicating at the other open mouth end through said perforated drum over an area of said drum comprising said object surface in the optical path of said camera; control means for selectively communicating said flow passage means in said drum with said flow channels of said vacuum shoe for varying the area of said drum subjected to said vacuum whereby said drum accommodates a plurality of sizes of documents; and drive means for driving film through said camera along said exposure plane and for rotating said drum at predetermined relative rates of movement.

7. A photocopier as defined in claim 6 wherein said control means for varying the vacuum imposed through said drum comprises a rotatable control tube disposed within said vacuum flow passage means of said drum and having a plurality of rows of slots, each of said rows having a different number of slots each alignable with one of said flow channels of said vacuum shoe whereby the area of the vacuum applied through said drum is varied in accordance with the number of said slots in said control tube aligned with said flow channels of said vacuum shoe.

8. A photocopier as defined in claim 7 wherein said camera is movable relative to said vacuum drum and said film drive of said camera is operable at any position of said camera relative to said drum to drive film therethrough at a predetermined rate relative to the rate of rotation of said drum proportional to the degree of reduction between a document being copied and the image of said document projected on said film through said optical system of said camera.

9. A photocopier as defined in claim 8 including vacuum switch means in said vacuum system interconnected with said drive means of said camera for stopping said camera responsive to reduction of the vacuum imposed through said drum to a predetermined value.

10. A photocopier comprising: a camera including film supply and takeup reel chambers and film drive means for moving film from said supply chamber to said take-up chamber; an optical system including a lens and an aperture slit disposed across the axis of the optical path of said lens perpendicular to the direction of movement of said film; said drive means of said camera driving the film along an exposure plane parallel with the plane of said slit and behind said slit from said lens; said optical system of said camera including a retractable viewing mirror movable into the optical path of said lens for through-the-lens viewing of a document within the optical path of said lens; a document conveyor including a perforated vacuum drum supported along an axis of rotation substantially perpendicular to and intersecting the optical axis of the said optical system of said camera and substantially parallel to said aperture silt; a vacuum shoe having a plurality of flow channels supported at fixed position within the said vacuum drum whereby said vacuum drum rotates around said vacuum shoe, each of said flow channels having a diverging mouth portion supported in close space relation with the inner surface of the perforated inner face of said drum for imposing a vacuum through said drum over an area of said drum facing said camera within the optical path of the optical system of said camera for holding a document tightly on the surface of said drum as said document is rotated by said drum, the area of said drum subjected to a vacuum depending upon the number of said flow channels communicated with the vacuum source of said photocopier, a hollow shaft extending along the axis of said drum providing a flow passage for vacuum communication into said drum, a vacuum control tube rotatably disposed in said drum shaft and provided with the plurality flow communication slots each alignable with one of said flow channels of said vacuum shoe for selectively communicating a predetermined number of said flow channels with said vacuum flow passage of said shaft for varying the area of said drum subjected to said vacuum; a vacuum pump connected in communication with said hollow shaft of said drum for applying a vacuum through said vacuum shoe in said drum; means operably associated with said drum above the area of said drum subjected to said vacuum for holding a document against said drum as said document is rotated by said drum toward said vacuum area, means associated with said drum below said vacuum area of said drum for holding a document against said drum as said document is conveyed by said drum away from said vacuum area; base means supporting said camera and said document conveyor, said camera being movable along said base means relative to said document conveyor for varying the distance between said vacuum drum and said camera; and means for driving said drum at a constant rate and for driving said camera for moving said film through said camera between said film supply and takeup reel chambers along said exposure plane at a predetermined constant rate relative to the rate of movement of said vacuum drum.

11. A photocopier as defined in claim 10 wherein said drive means includes an elongate drive shaft having driving surfaces along which said camera is movable between locations relative to said vacuum drum and power takeoff means adapted to move with said camera along said drive shaft for transferring power from said drive shaft to said camera drive means at any location of said camera along said drive shaft.

12. A photocopier as defined in claim 11 wherein said power takeoff means includes a sleeve disposed coaxially on said shaft and movable along the length of said shaft, drive means on said sleeve for transfer of power from said sleeve as said sleeve rotates with said shaft, and contact arms pivotally supported at one end with said sleeve and biased at the other free end against said driving surfaces on said shaft whereby said shaft rotates said contact arms for rotating said sleeve at any position of said arms along the length of said shaft, said free ends of said arms biased against said shaft being movable along said shaft with said sleeve for transferring power from said shaft at any position of said power takeoff means along the length of said shaft.

References Cited

UNITED STATES PATENTS

| | | | |
|---|---|---|---|
| 601,883 | 4/1898 | Schwartz | 355—91 |
| 2,537,529 | 1/1951 | Hessert et al. | 355—64 |
| 2,753,181 | 7/1956 | Anander | 271—74 |
| 3,216,316 | 11/1965 | Brownscombe | 355—49 |

NORTON ANSHER, Primary Examiner

D. J. CLEMENT, Assistant Examiner

U.S. Cl. X.R.

271—51; 355—76